June 3, 1930.  R. A. SMITH  1,761,497
SUPPORTER FOR FISHING RODS
Filed July 16, 1929
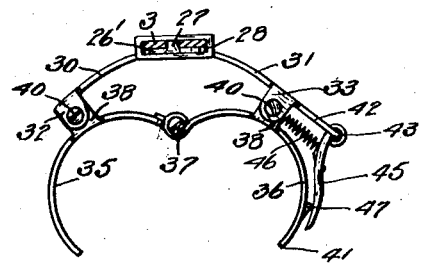
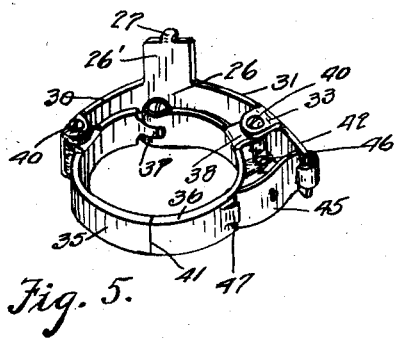
Fig. 4.
Fig. 5.
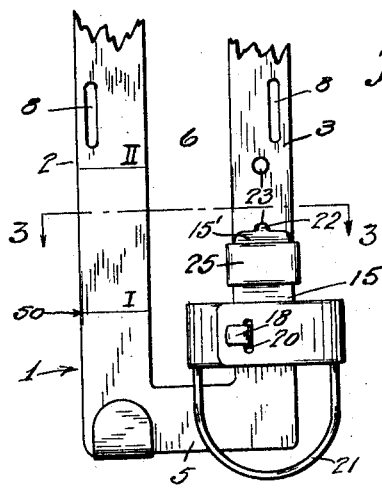
Fig. 2.
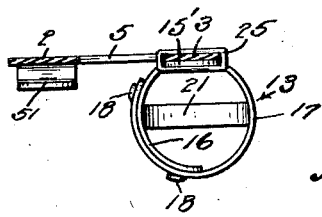
Fig. 3.
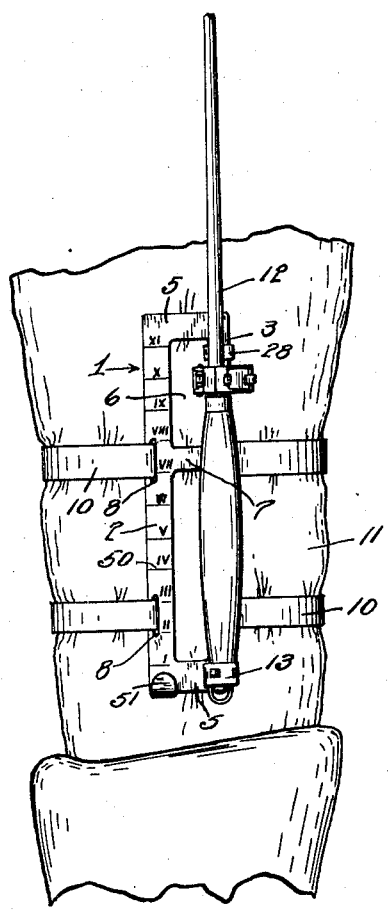
Fig. 1.
Inventor;
ROBERT A. SMITH,
By Horace Barnes,
Attorney.

Patented June 3, 1930

1,761,497

UNITED STATES PATENT OFFICE

ROBERT A. SMITH, OF PORTLAND, OREGON, ASSIGNOR OF ONE-HALF TO BARNEY C. GAROFF, OF PORTLAND, OREGON

SUPPORTER FOR FISHING RODS

Application filed July 16, 1929. Serial No. 378,683.

This invention relates to improvements in rod-supports for fishermen.

It is well known that sportsmen when fishing in streams with rod and reel are often inconvenienced and at a loss as to how and where to support the rod when changing flies or baiting the hook. Hence the principal object of my invention is to provide a simple and practicable device readily attachable to the person of the user to afford a support for fishing-rod while engaged in fishing.

A further object of the invention is the provision of simple and novel devices for readily receiving and securing the fishing-rod in erect position including a frame provided with means for conveniently fastening it to the leg of the wearer and an adjustably mounted socket on said frame to support the butt of the rod, together with a spring-pressed openable clasp adjustably mounted above the socket and arranged to releasably retain the rod at rest and ready for instant removal and to stand open in set position to be instantaneously and automatically closed upon the insertion of the rod therein.

Other objects and advantages incidental in the carrying out of my invention, and objects relating to details of construction and arrangements of the various elements will be fully set forth in the course of the detailed description to follow.

The accompanying drawings illustrate by way of example one form in which my invention may be embodied and utilized, in which:

Figure 1 is a pictorial view showing an embodiment of my invention in front elevation applied to a leg of the user.

Fig. 2 is a fragmentary view in front elevation of my supporter, upon an enlarged scale.

Fig. 3 is a view in cross-section on line 3—3 of Fig. 2.

Fig. 4 is a plan view of the spring-clasp element of my invention, shown in open condition.

Fig. 5 is a detached perspective view of the same when closed.

Referring to said views, the reference numeral 1 indicates generally a flat plate of relatively light spring-metal in the form of a hollow parallelogram having side-bars 2 and 3 extending in parallel with the longitudinal or major axis of the plate and integrally connected by end-connectives 5. Interior cut-out spaces 6 are provided for lightness and a connecting integral strip 7 is provided to strengthen the plate. Pairs of slots 8 are formed oppositely in the respective bars in which adjustable straps 10 may be fastened to encircle the leg 11 of the user, preferably above the knee with the plate upon the outer side of the leg, and thus secure the plate in convenient position to hold the rod 12, as seen in Fig. 1.

A socket device 13 in which the butt-end of the rod may be seated is adjustably secured at the lower end of the plate. Such socket consists in a base 15 adapted to lie flat against the bar 3. Curved branches 16 and 17 extend from opposite sides of said base to form an encircling band for the lower end of the rod. Said band is adjustable in girth by means of simple devices consisting in a pair of hooked-portions 18 struck out from the branch 16 and engaging within correspondingly spaced apertures 20 in the branch 17. A strip 21 rigidly secured at its opposite ends to the respective branches is looped downwardly in its middle portion and upon which the end of the rod is supported while the circular band holds it in place. The base 15 extends upwardly, as at 15', above band and terminates in a reduced hooked tongue 22 which is adapted to engage within either of a plurality of spaced holes 23 in the plate while a slide 25 encircling the bar 3 is slipped over the base-part 15' to frictionally engage and hold the socket securely in its set position.

Adjacent the upper end of the plate a spring-clasp device is provided consisting in a base 26 of spring-metal having a portion 26' similar in form and functions with its counterpart 15' of the socket and is similarly formed with a terminal tongue 27 adapted to be engaged in spaced holes, not shown, at the upper part of the bar 3 similar to said holes 23. A slide 28 serves to maintain the device in place in an analogous manner to that by which the socket is secured.

Integral branches 30 and 31 extend oppositely from the base 26 in lateral, outwardly curved directions. The shorter of the two branches, 30, is formed at its extremity with a pair of inwardly turned apertured ears 32 to form the standing element of a hinge-joint, as will presently be described. Similar ears 33 are formed upon the opposite branch 31 at a point equi-distant from the base as are the ears 32. Substantially semi-circular jaws 35 and 36 are hingedly connected together at their inner ends, as at 37, and are each formed with outwardly directed apertured ears 38 interfitting within the ears 32 and 33, respectively, of the branches to form a hinge-joint with the respective branches by means of the pintles 40, with the joint 37 therebetween at mid-distance.

Thus when the jaws are closed, as seen in Fig. 5, they assume a substantially annular form in practically concentric relation with the branches 30 and 31 and with the outer ends 41 of such jaws closing in registered engagement under the relatively light but effective spring-pressure afforded by the spring-branches 30 and 31.

The branch 31 is formed with an extension 42 terminating in a slotted end in which the eye 43 of a dog 45 is pivotally engaged. Said dog is resiliently urged inwardly by means of a coil-spring 46 secured at one end to the dog and at its inner end to the proximate pintle 40. Such spring urges the dog against the jaw 36 upon which a stop 47 is provided against which the dog engages when the jaws are closed and prevents the accidental opening of the jaws or until the dog has been displaced therefrom, as shown in Fig. 4.

The spring-tension in the branches 30 and 31 is sufficient to maintain the jaws closed under usual conditions and the dog 45 serves as additional security. To open the jaws the dog is displaced and the jaws pulled apart which will cause the hinge 37 to move outwardly and slightly spreading the spring-branches apart until said hinge will pass beyond the center-line through the joints formed by the pintles 40 whereupon the resilience of the branches will assert themselves to cause the jaws, as seen in Fig. 4, to stay open for an indefinite period.

Thus the rod may be readily removed with one hand and can be even more easily replaced and clasped in security by simply setting the butt of the rod in the socket 13 and inserting the rod thereabove within the compass of the open jaws 35 and 36 and pressing lightly with the rod against the joint 37 in a simple and most obvious movement whereupon the jaws 35 and 36 will close with a snap as the tension of the spring-branches asserts itself by the joint 37 passing within the line of dead center of the jaw connections.

It will be readily seen that the fisherman is provided in my device with a most useful convenience and practicable support for a rod while engaged in fishing. When wading a stream or casting from a bank or boat he at all times has at his side a support for the rod available so that he will have both hands free to bend a new fly upon the line or attach the bait or for any other purpose desired.

A most convenient addition to the device is provided in a measurement scale 50 inscribed upon the bar 2 that may be graduated in inches and with which the fisherman may readily determine the length of the fish caught. To facilitate the use of the scale an integral lug 51 is upturned at the lower end of the bar 2 in which the tail of the fish may be engaged when measurements are taken.

Having described my invention, what I claim, is:—

1. In a supporter for fishing-rods, a clasp including a pair of resilient branched arms, a pair of semi-circular jaws pivotally connected to said arms, respectively, and hingedly connected together at their inner ends whereby said jaws may be closed by the tension of said arms and held in open condition through said hinge-connection passing beyond a line through the pivotal connection of the jaws with said arms.

2. In a supporter for fishing-rods, a clasp including a pair of resilient branched arms, a pair of semi-circular jaws pivotally connected to said arms, respectively, and hingedly connected together at their inner ends whereby said jaws may be closed by the tension of said arms and held in open condition through said hinge-connection passing beyond a line through the pivotal connection of the jaws with said arms, and spring-pressed means to secure said jaws in closed position.

Signed at Portland, Oregon, this 1st day of July, 1929.

ROBERT A. SMITH.